UNITED STATES PATENT OFFICE.

SAMUEL CABOT, OF BOSTON, MASSACHUSETTS.

COMPOSITION FOR STAINING AND FIREPROOFING WOOD.

SPECIFICATION forming part of Letters Patent No. 666,647, dated January 29, 1901.

Application filed June 22, 1900. Serial No. 21,219. (No specimens.)

*To all whom it may concern:*

Be it known that I, SAMUEL CABOT, a citizen of the United States, residing at Boston, in the county of Suffolk and State of Massachusetts, have invented a new and useful Improvement in Compositions for Staining and Preserving Wood, of which the following is a specification.

My invention relates to the art of staining and preserving wood; and it consists of an improved composition whereby wood or analogous fibrous materials may be stained, preserved, and at the same time rendered highly resistant to flame or radiated heat. Wood or analogous fibrous materials used in or upon buildings may not only be given almost any desired tint by the use of this new composition, but will also be fire-resistant.

In my United States Patent No. 297,568, issued April 29, 1884, there is described a composition of matter useful in staining and preserving wood, and in compounding the new composition which is the subject of this invention I prefer to use a stain such as is described in that patent. Other stains may be used, however, and I do not wish to be understood as in any wise limited herein to the composition of matter described in my aforesaid patent. I refer thereto for a description of a stain which will serve admirably in the preparation of the new composition herein to be described merely for the sake of brevity.

To prepare this new composition, I take a salt, preferably of a non-inflammable base, which possesses the property of wasting away under the application of heat and passing into a vaporous or gaseous condition, either with or without actual chemical dissociation of its elementary components. Volatile salts which disappear in vapor at a given temperature waste away without suffering such complete dissociation of components as do salts which, while not volatile in the strict sense, waste away by progressive dissociation of components. Of the salts susceptible to wasting away under the influence of heat the latter class is, I believe, best adapted to fireproofing purposes, by reason of the protraction of the period during which the wasting process takes place, although volatile salts are of value for the purpose. I comminute such a salt until it is in condition to mix thoroughly and intimately with a liquid stain and then mix the salt and the stain. The character of the salt selected for the purpose should be such that the salt will remain substantially permanent under ordinary conditions, and such also that it will pass into a vaporous or gaseous condition at temperatures below the ignition-point of the wood or other material to which the stain impregnated with the salt is to be applied. If a stain such as the inflammable stains derived from petroleum is used, which lowers the ignition-point below that naturally possessed by the material stained, the salt which is mixed with the stain should be of such a character as to pass into a vaporous or gaseous condition, either wholly or in substantial measure, at temperatures below the ignition-point of the stain used or that of the wood when impregnated with such a stain. Salts of this character which are soluble partially or wholly in water are not so effective as salts insoluble in water, for the reason that when wood or other building material treated with a salt-impregnated stain is exposed to the weather rain will dissolve away a soluble salt, even to a considerable depth in the material. Where the stained and fireproofed wood is used in unexposed places, the solubility of the salt employed with the stain is not of so much consequence. The salts which I have found to be best adapted to the uses aforesaid are those in which the base is non-inflammable and volatile at a temperature below that of the ignition of the material to which the stain is applied, while the acid or acids with which the base is combined to form the salts are volatile or dissociable at temperatures but slightly higher than the volatilizing-point of the base. Thus I employ any stain, preferably a creosote-oil stain, such as described in my patent aforesaid, and mix therewith a quantity of finely-divided salt of the character above defined—*e. g.*, basic sulface of ammonium and magnesium—until a suspended mixture or emulsion is formed. The thickness of this emulsion is to be regulated by the character of the material to be treated. Any person experienced in mixing pigments with creosote-oil will be enabled to gage the proper quantity of salt to be used. For average conditions—*e. g.*, for staining shingles—I have found that ten per cent., by weight, of sulfate of ammonium and magnesium in creosote stain gives good results. If a stain colored with pigments or other coloring-matter is used, care should be taken to select a salt which will not react upon the coloring-matter to destroy or modify its effect, unless such modification is actually desired. The composition thus obtained will readily enter the pores or grain of the material to be treated and will stain it effectively. At the same time the salt is carried into the pores or grain and distributed over the surface.

The capacity of the salt to escape, either wholly or in substantial measure, by vaporization or transmission to a gaseous condition, either wholly or in part by volatilization or progressive dissociation of its component elements, renders it effective to reduce the temperature of the material if it is exposed to heat, and thus decreases the inflammability of the material impregnated thereby.

What I claim, and desire to secure by Letters Patent, is—

1. A new composition of matter consisting of a wood-stain commingled with a salt susceptible of wasting away under the influence of heat at temperatures below the normal ignition-point of carbon.

2. A new composition of matter consisting of a wood-stain commingled with a salt of a non-inflammable base, the said salt being susceptible of wasting away under the influence of heat at temperatures below the normal ignition-point of carbon.

3. A new composition of matter consisting of a wood-stain commingled with a salt insoluble in water, and susceptible of wasting away under the influence of heat.

4. A new composition of matter consisting of a wood-stain commingled with a salt of a non-inflammable base, said salt being insoluble in water and susceptible of wasting away under the influence of heat.

5. A new composition of matter consisting of a creosote-oil stain commingled with a salt susceptible of wasting away under heat.

6. A new composition of matter consisting of a creosote-oil stain commingled with a salt of a non-inflammable base, the said salt being susceptible of wasting away under the influence of heat.

7. A new composition of matter consisting of a creosote-oil stain commingled with a salt insoluble in water and susceptible of wasting away under the influence of heat.

8. A new composition of matter consisting of a creosote-oil stain commingled with a salt of a non-inflammable base, the said salt being insoluble in water and susceptible of wasting away under the influence of heat.

9. A new composition of matter for staining and fireproofing wood, consisting of a creosote-oil stain commingled with a basic sulfate of ammonium and magnesium.

Signed by me at Boston, Massachusetts, this 21st day of June, 1900.

SAML. CABOT.

Witnesses:
THOMAS M. VINSON,
MARTIN J. GILMARTIN.